(12) United States Patent
Mork et al.

(10) Patent No.: US 12,230,975 B2
(45) Date of Patent: Feb. 18, 2025

(54) ASSEMBLY FOR CONTACTLESS TRANSFER OF ELECTRICAL ENERGY TO A ROTOR

(71) Applicant: Deere & Company, Moline, IL (US)

(72) Inventors: Alexander M. Mork, West Fargo, ND (US); Michael L. Rhodes, Ritchfield, MN (US)

(73) Assignee: DEERE & COMPANY, Moline, IL (US)

( * ) Notice: Subject to any disclaimer, the term of this patent is extended or adjusted under 35 U.S.C. 154(b) by 277 days.

(21) Appl. No.: 17/805,354

(22) Filed: Jun. 3, 2022

(65) Prior Publication Data

US 2023/0396099 A1 Dec. 7, 2023

(51) Int. Cl.
*H02J 50/12* (2016.01)
*H02J 50/00* (2016.01)
*H02J 50/40* (2016.01)
*H02K 11/00* (2016.01)

(52) U.S. Cl.
CPC ............ *H02J 50/12* (2016.02); *H02J 50/005* (2020.01); *H02K 11/00* (2013.01); *H02J 50/402* (2020.01)

(58) Field of Classification Search
CPC .... H01F 38/18; H01F 27/2804; H01F 27/303; H02K 11/00; H02J 50/12; H02J 50/005; H02J 50/402
USPC ........................................................ 310/68 R
See application file for complete search history.

(56) References Cited

U.S. PATENT DOCUMENTS

| 4,233,580 A | 11/1980 | Treczka et al. |
| 4,939,400 A | 7/1990 | Matsushita et al. |
| 7,808,346 B2 | 10/2010 | Fischer et al. |
| 8,405,279 B2 | 3/2013 | Elmegreen et al. |
| 8,527,241 B2* | 9/2013 | Mitchell ................. F01D 17/02 702/188 |
| 9,071,888 B2* | 6/2015 | Subramanian .......... F01D 17/02 |
| 9,413,049 B2* | 8/2016 | Wootan .................. H01R 39/08 |
| 9,853,694 B2* | 12/2017 | Sloutsky ................. H04B 5/24 |
| 10,265,450 B2* | 4/2019 | Eldridge .............. H01R 13/641 |
| 10,357,220 B2* | 7/2019 | Shippen ................. H04W 4/80 |
| 10,782,818 B2 | 9/2020 | Deng et al. |

(Continued)

FOREIGN PATENT DOCUMENTS

| CN | 1752725 A | 3/2006 |
| JP | 2018-160605 A | 10/2018 |

OTHER PUBLICATIONS

Extended European Search Report and Written Opinion issued in European Patent Application No. 23161004.9, dated Oct. 24, 2023, in 10 pages.

(Continued)

*Primary Examiner* — Alex W Mok

(57) ABSTRACT

An assembly for transferring electrical energy comprises a stator. A rotor is separated from the stator for relative rotation with respect to the stator. An axial gap is defined between the rotor and the stator. A transmitter is associated with or on the stator, where the transmitter is configured to transmit an alternating current (AC) wireless signal. An annular clamp comprises a first semi-elliptical portion and a second semi-elliptical portion that define an opening for receipt of the rotor. The annular clamp has fasteners to secure the first semi-elliptical portion to the second semi-elliptical portion about the rotor. A receiver is associated with of the annular clamp.

17 Claims, 11 Drawing Sheets

(56) References Cited

U.S. PATENT DOCUMENTS

| | | | | |
|---|---|---|---|---|
| 10,839,999 | B2* | 11/2020 | Cayton | H01F 27/04 |
| 2015/0097464 | A1* | 4/2015 | Welch | H02K 3/51 |
| | | | | 310/270 |
| 2020/0259370 | A1 | 8/2020 | Ichikawa et al. | |
| 2020/0264060 | A1 | 8/2020 | Venzal | |

OTHER PUBLICATIONS

Abdolkhani et al., A Double Stator Through-hole Type Contactless Slipring for Rotary Wireless Power Transfer Applications, IEEE Transactions on Energy Conversion, vol. 29, No. 2, Jun. 2014, pp. 426-434.

Stefan Ditze et al., Inductive Power Transfer System with a Rotary Transformer for Contactless Energy Transfer on Rotating Applications, dated 2016, pp. 1622-1625.

Lajnef et al., Self-Powered Piezo-Floating-Gate Smart-Gauges Based on Quasi-Static Mechanical Energy Concentrators and Triggers, IEEE Sensors Journal, vol. 15, No. 2, Feb. 2015, pp. 676-683.

Contactless Rotary Electrical Couplings, Mar. 1, 2003, pp. 1-7, [online]. Retrieved from the Internet <URL: https://www.techbriefs. com/component/content/article/tb/pub/techbriefs/electronics-and-computers/918>.

Contactless Data and Power Transmission for 360° Real-Time Applications, pp. 1-5, [online]. Retrieved from the Internet <URL: https://www.spinner-group.com/en/products/rotating-contactless-data-and-power-transmission>.

Jia-You Lee et al., Design of an Improved Type Rotary Inductive Coupling Structure for Rotatable Contactless Power Transfer System, MATEC Web of Conferences, dated 2015, pp. 1-6, [online]. Retrieved from the Internet <URL: https://www.matec-conferences. org/articles/matecconf/pdf/2015/15/matecconf_icmme2015_06001. pdf>.

Mechanical stress concentrator with notches, axial stress sensing, pp. 1-5, [online]. Retrieved from the Internet <URL: https:// mechanicalc.com/calculators/stress-concentration/>.

Mechanical stress concentrator with notches, torque stress sensing, pp. 1-5, [online]. Retrieved from the Internet <URL: https:// mechanicalc.com/calculators/stress-concentration/>.

TelMA Torque—the revolutionary torque measurement for Industry 4.0 and machine monitoring, pp. 1-7 [online]. Retrieved from the Internet <URL: https://www.sensortelemetrie.de/en/products/torque-measurement-technology/telma-torque-miniaturised-torsion-sensor/>.

\* cited by examiner

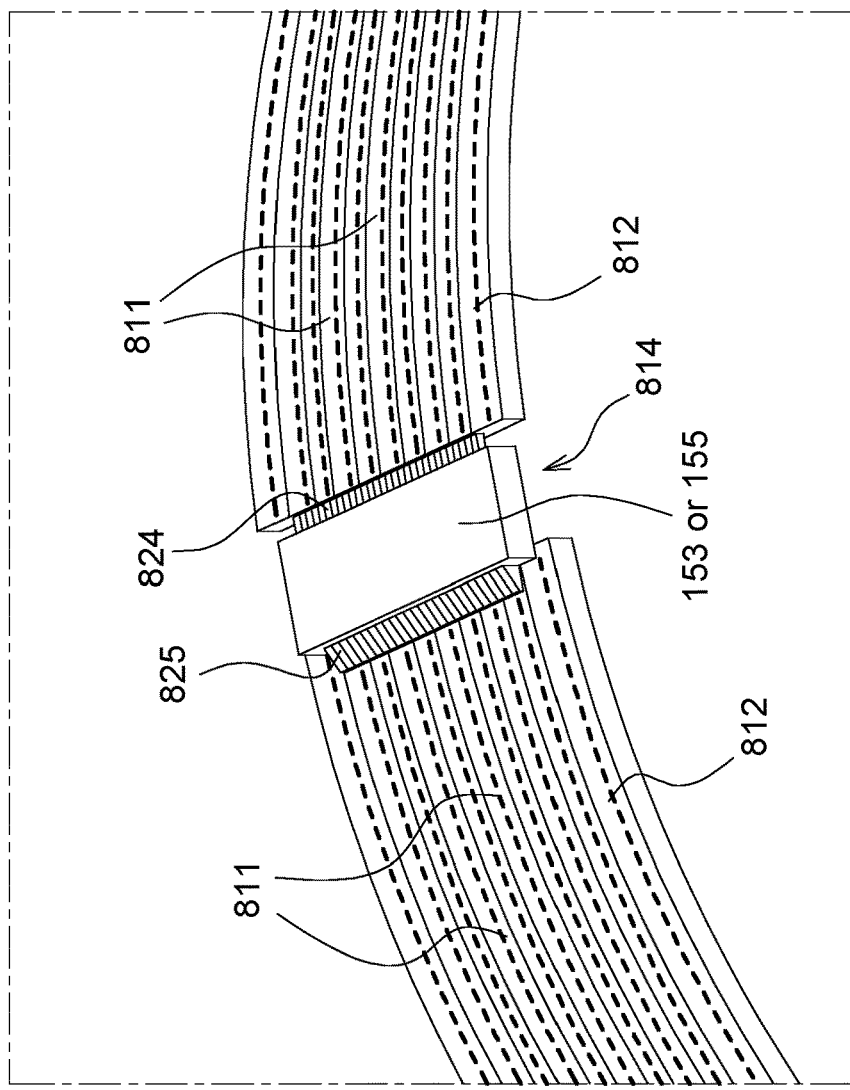
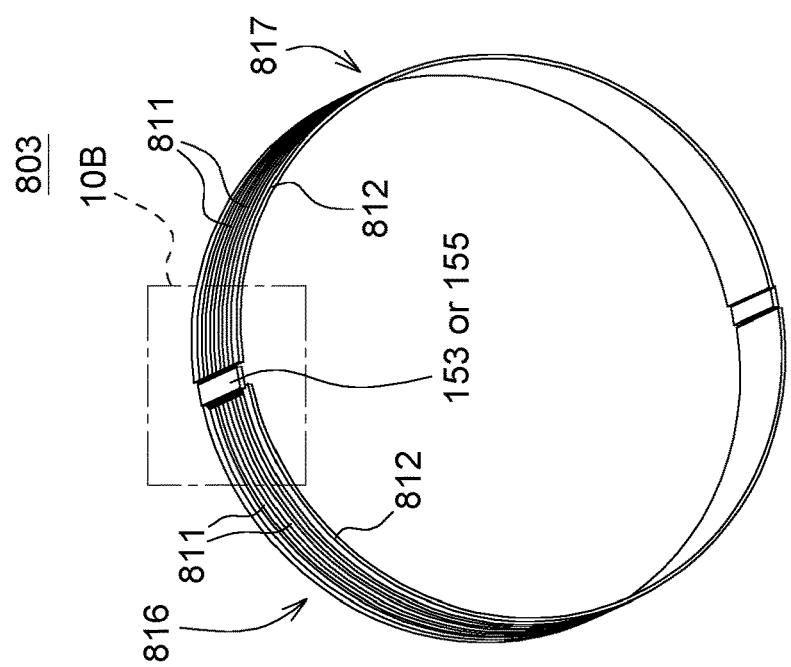
FIG. 10A
FIG. 10B

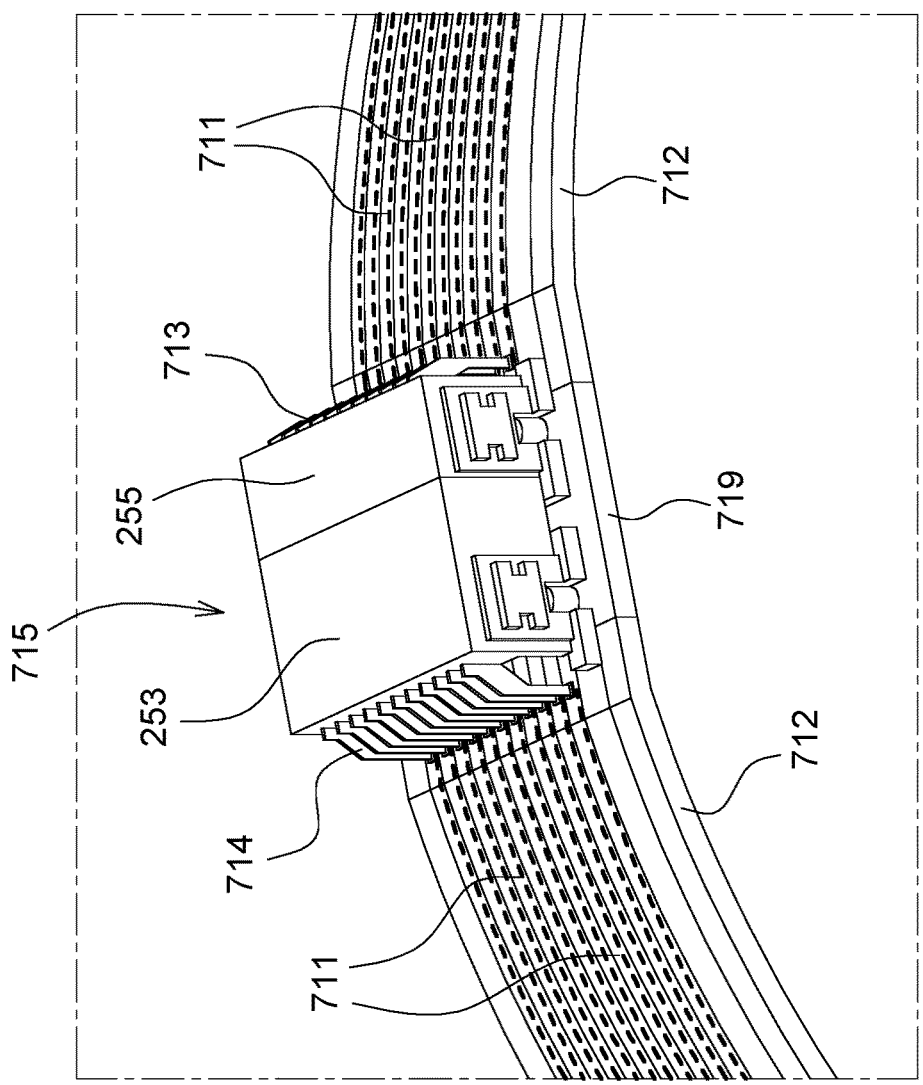
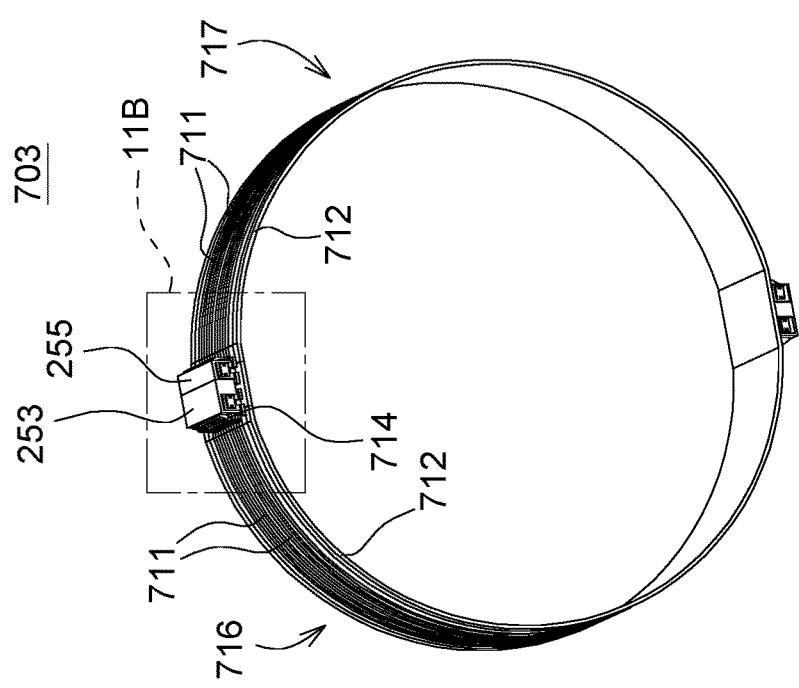
FIG. 11B
FIG. 11A

ASSEMBLY FOR CONTACTLESS TRANSFER OF ELECTRICAL ENERGY TO A ROTOR

FIELD

This disclosure relates to an assembly for contactless transfer of electrical energy to a rotor.

BACKGROUND

In certain prior art, brushes, contacts or commutators are used to transfer electrical energy between the stator and rotor of an electrical assembly. However, brushes and contacts have are susceptible to mechanical abrasion, friction and wear that tend to require regular service with replacement parts. In some prior art, wireless or contactless power transfer tends to result in pulsating or varying reception of energy at a receiver on the rotor that is based on an angular position or speed of the shaft associated with discrete antennas or based on a "single-pole" magnet configuration. Therefore, there is a need for an assembly for contactless transferring of electrical energy to a rotor.

SUMMARY

In accordance with one aspect of the disclosure, an assembly for transferring electrical energy comprises a stator. A rotor (e.g., rotational shaft) is separated from the stator for relative rotation with respect to the stator. An axial gap is defined between the rotor and the stator. A transmitter is associated with or on the stator, where the transmitter is configured to transmit an alternating current (AC) wireless signal. An annular clamp comprises a first semi-elliptical portion and a second semi-elliptical portion that define an opening for receipt of the rotor. The annular clamp has fasteners to secure the first semi-elliptical portion to the second semi-elliptical portion about the rotor. A receiver is associated with of the annular clamp.

In accordance with another aspect of the disclosure, the receiver is further coupled to the receive antenna and configured to facilitate the uniform transfer of electrical energy via the axial gap between the transmitter and the receive antenna over a full angular range of rotation of the rotor.

BRIEF DESCRIPTION OF THE DRAWINGS

FIG. 10A is a perspective view of another embodiment of an antenna, which comprises a flexible circuit board, in accordance with the assembly.

FIG. 10B is an enlarged view of rectangular region 10B in FIG. 10A.

FIG. 11A is a perspective view of yet another embodiment of an antenna, which comprises another flexible circuit board, in accordance with the assembly.

FIG. 11B is an enlarged view of rectangular region 11B in FIG. 11A.

DETAILED DESCRIPTION

Figure 1:
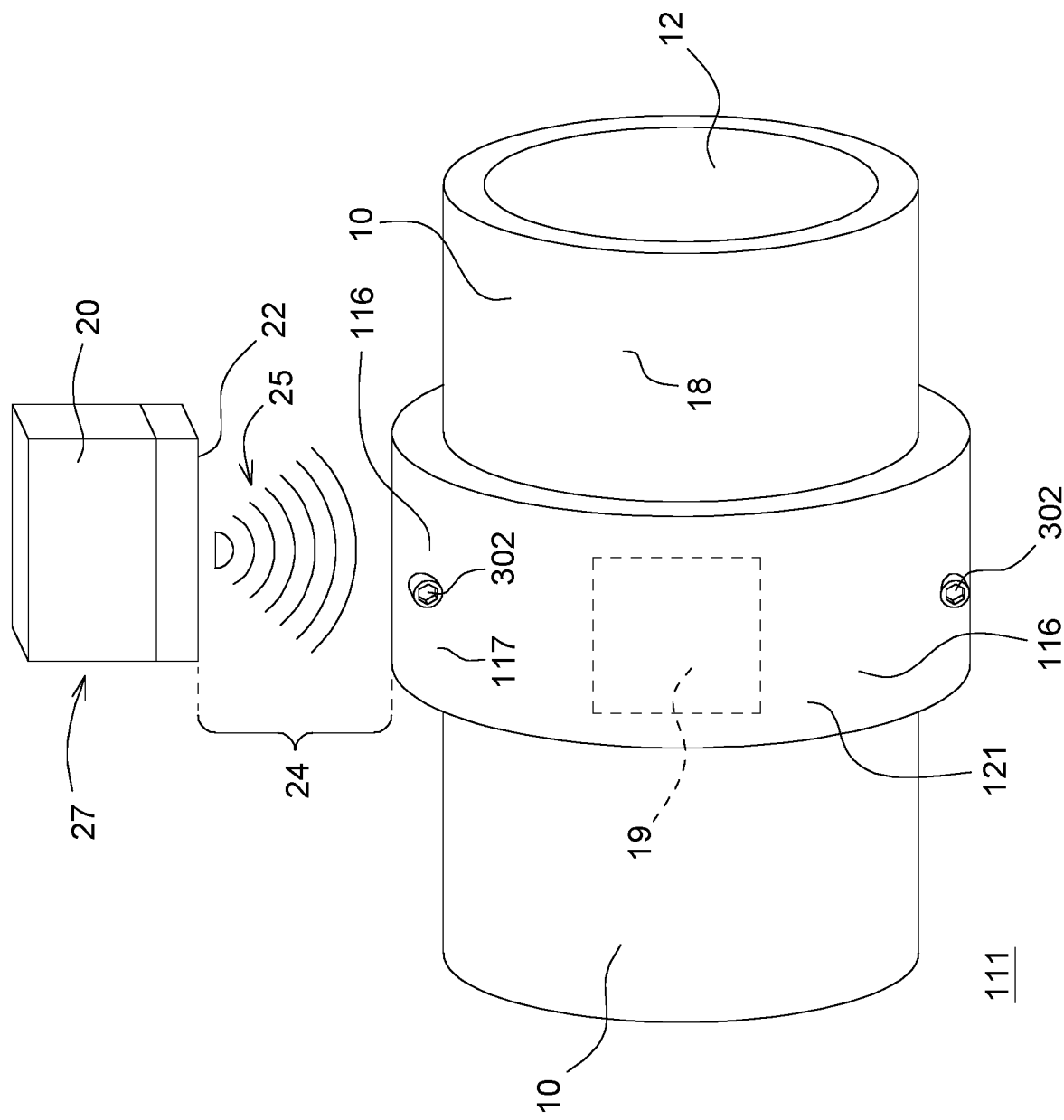
FIG. 1 is a perspective view of a first embodiment of an assembly for contactless transferring electrical energy to a rotor, such as a rotational shaft.
Figure 2:
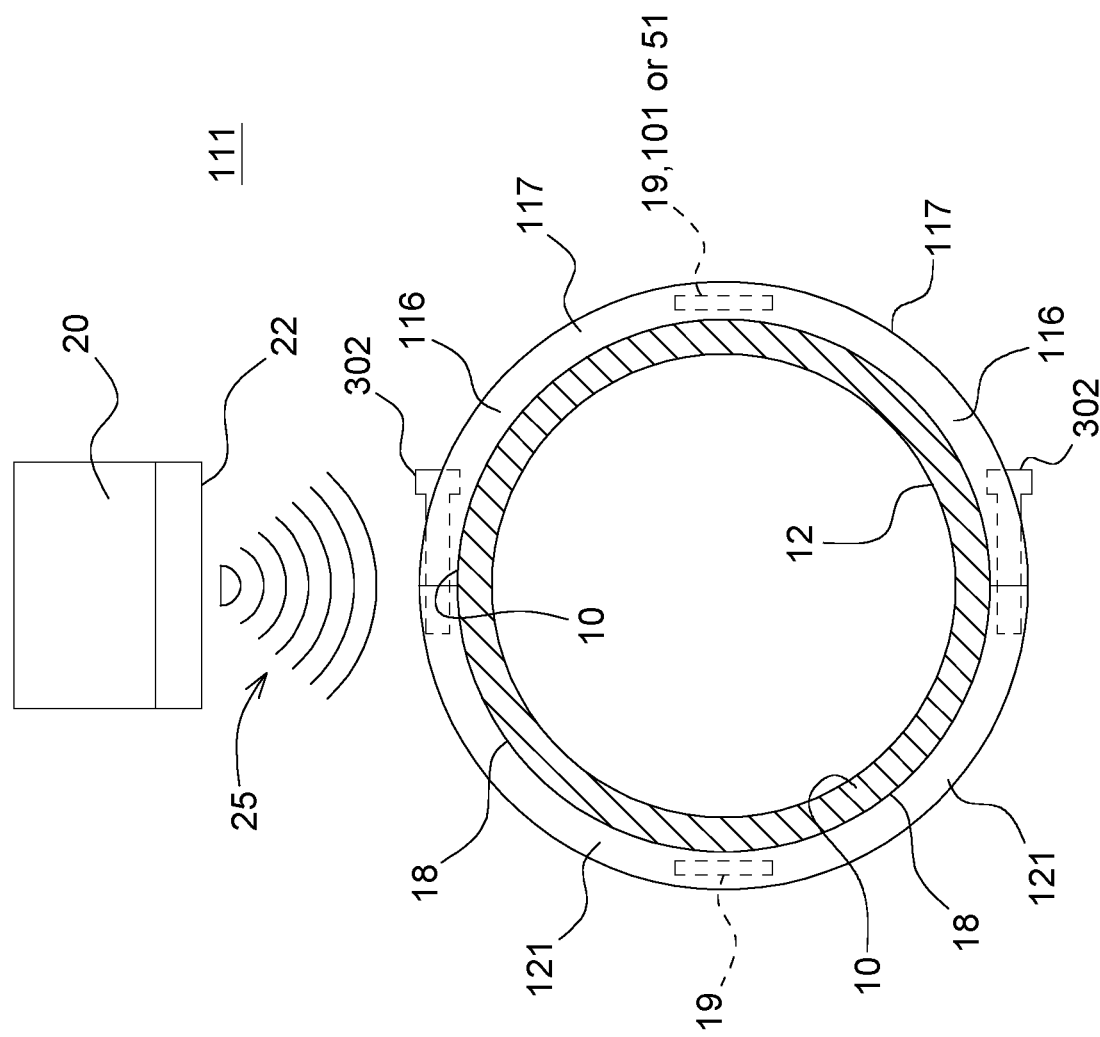
FIG. 2 is a cross-sectional view of the first embodiment of a rotor (e.g., rotational shaft) with an annular clamp and the transmitter in accordance with FIG. 1.
Figure 3:
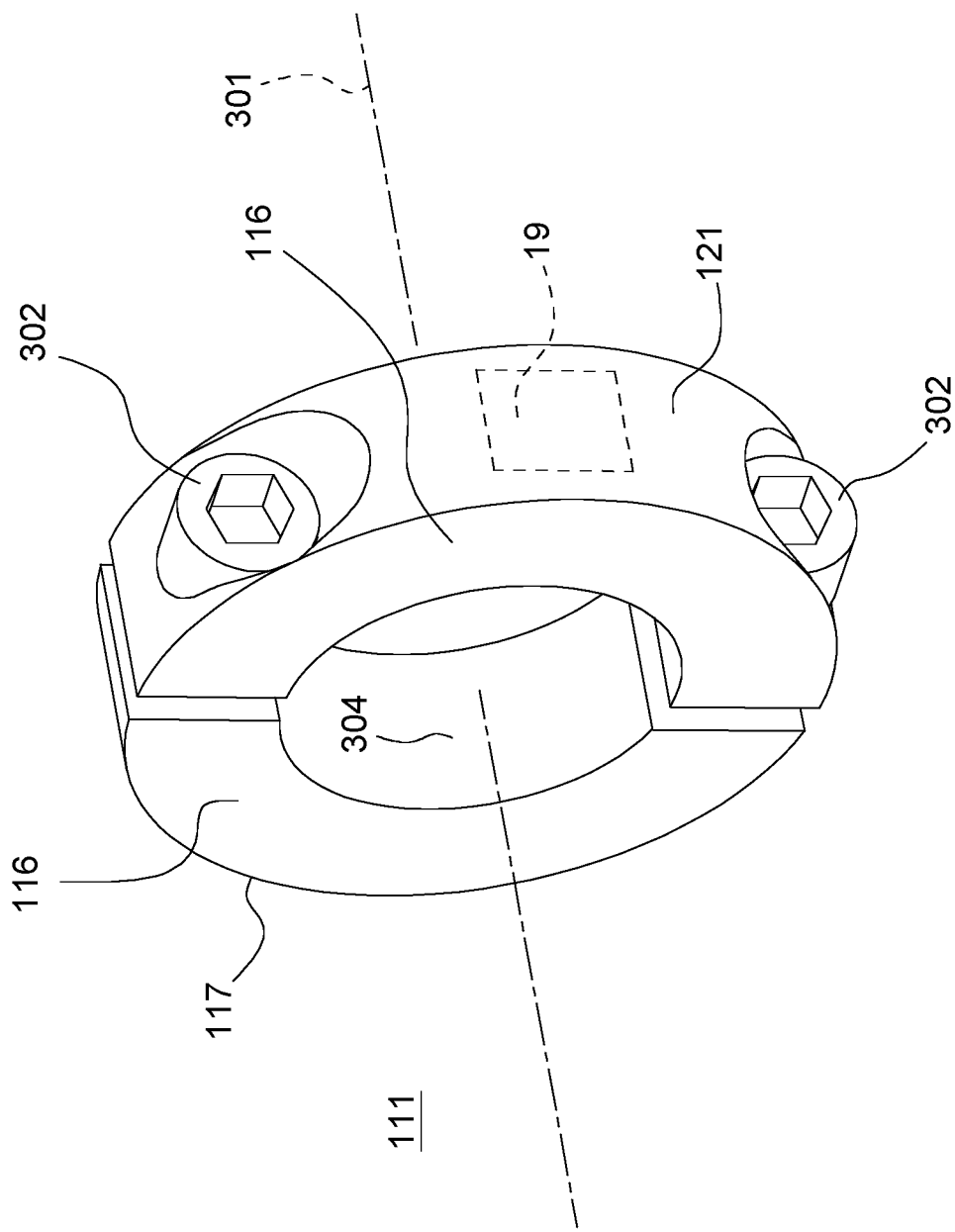
FIG. 3 is perspective of an annular clamp, consistent with FIG. 1.

In accordance with one embodiment, as illustrated in FIG. 1 through FIG. 3, inclusive, an assembly 111 for transferring electrical energy comprises a stator 27. A rotor 10 is separated from the stator 27 for relative rotation with respect to the stator 27. An axial gap 24 or air gap is defined between the rotor 10 and the stator 27, which is characteristic of an assembly for contactless or non-contact transfer of power. A transmitter 20 is associated with or on the stator 27, where the transmitter 20 is configured to transmit an alternating current (AC) wireless signal 25. Although many configurations are possible and fall within the scope of the appended claims in one configuration, the axial gap is less than or equal to approximately 20 millimeters (e.g. less than or equal to 15 millimeters). An annular clamp 116 comprises a first semi-elliptical portion 117 and a second semi-elliptical portion 121 that define an opening for receipt of the rotor 10. The annular clamp 116 has fasteners to secure the first semi-elliptical portion 117 to the second semi-elliptical portion 121 about the rotor 10.

In one configuration, the transmit antenna 22 may comprise one or more conductive traces on a generally planar circuit board to produce a defined inductance. Further, the inductive traces may be concentrically laid out on the circuit board across multiple circuit board layers to create a known inductance. In another configuration, the transmit antenna 22 may comprise a transmitting coil that is wound around a ferrite core to generate and direct a wireless signal and electromagnetic radiation pattern toward the receive antenna (603, 703, 803). A capacitor may be connected or coupled to the conductive traces of the transmit antenna to tune the defined inductance or known inductance. The transmitter 20 generates an input frequency or input frequency range to excite the transmit antenna that generates a wireless signal or electronic magnetic signal that can be received by the receiver antenna. The assembly supports the generally continuous amplitude received electrical energy, where the receive antenna (603, 703, 803) comprises a multi-turn conductive loop that is located around the rotor 10 (e.g., shaft).

One or more receivers 19 are associated with of the annular clamp 116. Each receiver 19 is further coupled to the receive antenna and configured to facilitate the uniform transfer of electrical energy via the axial gap 24 between a transmit antenna of the transmitter 20 and the receive antenna 603 over a full angular range of rotation of the rotor 10 (e.g., shaft).

In one embodiment, the rotor 10 further comprises a rotational shaft, such as a hollow shaft with an inner surface 12 that is substantially cylindrical and an outer surface 18 that is substantially cylindrical; interior surface 304 (e.g., inner diameter) of the annular clamp 116 is generally cylindrical; the interior surface 304 (e.g., inner diameter) of the annular clamp 116 is arranged to receive the rotor 10 or rotational shaft to retain the annular clamp 16 for mutual (synchronous) rotation with the rotor 10. For example, in some configurations the rotor 10 or shaft may be configured to operate at speeds or rotation velocity that range from zero to approximately 6,000 revolutions per minute (RPM) (e.g., 3000 RPM).

FIG. 3 is perspective view of one embodiment of annular clamp 116, consistent with FIG. 1. When assembled, the annular clamp 116 forms a generally annular shape about central axis 301 (or rotational axis) that is located radially inward from interior surface 304 (e.g., inner diameter) of the clamp 116. In FIG. 3, the removable clamp 116 or removable collar is retained by a press-fit or compressive force against the rotor 10, such as a rotational shaft. For example, an interior surface 304 of the clamp 116 is tightened around an outer surface or outer diameter of a rotor 10 or shaft to retain the annular clamp 116 for mutual (synchronous) rotation with the rotor 10.

As illustrated in FIG. 3, the annular clamp 116 comprises a first semi-elliptical portion 117 and a second semi-elliptical portion 121. When assembled, the annular clamp 116 has fasteners 302 to secure the first semi-elliptical portion 117 to the second semi-elliptical portion 121 in compression (e.g., or even with compressive and tensile forces) about the rotor 10. In one configuration of the clamp 116, the first semi-elliptical portion 117 has a first pair of openings (e.g., bores) and the second semi-elliptical portion 121 has a second set of threaded openings (e.g., threaded bores) for receiving the fasteners 302. The fasteners 302 are used to join or assemble the removable annular clamp 116 or removable collar by joining or securing the first semi-elliptical portion 117 to the second semi-elliptical portion 121. The fasteners 302 are countersunk within recesses, such that the heads of the fasteners 302 can be substantially flush (e.g., or near flush, or slightly protruding within the clearance of the gap 24) with an outer surface of the annular ring 116.

The annular clamp 116 comprise a first semi-annular antenna portion 602 (e.g., arched antenna portion) within, embedded in, or associated with the first semi-elliptical portion 117. The annular clamp 116 comprise a second semi-annular antenna portion 604 (e.g. arched antenna portion) within, embedded in, or associated with the second semi-elliptical portion 121. For example, the first semi-annular antenna portion 602 and the second semi-annular antenna portion 604 comprise a set of axially spaced, parallel conductors that are located coaxially and radially outward from central axis 301. The first semi-annular antenna portion 602 and the second semi-annular antenna portion 604 are electrically and mechanically connected to form a receive antenna (603, 703, 803), such as the embodiments illustrated in FIG. 9A through 11B, inclusive. In any embodiment, the receive antenna (603, 703, 803) generally comprises a first semi-annular antenna portion (e.g., 602) and a second semi-annular antenna portion (e.g., 604) located coaxially and radially outward from a central axis 301 or a substantially cylindrical interior surface of the annular clamp (16, 116), wherein the first semi-annular antenna portion and the second semi-annular antenna portion are united to form one or more looped conductors of the receive antenna 603. Any of the receive antennas (e.g., of distributed antenna elements) of FIG. 9A through 11B, inclusive, can be incorporated into, or embedded within, the clamp 116 of FIG. 1 through FIG. 3, inclusive.

The annular clamp 116 can be described as a substantially cylindrical split-hollow core of the annular member, which can be joined together as the annular clamp 116 at seams or a joint in which the first semi-annular antenna portion 602 is electrically and mechanically connected to the second semi-annular antenna portion 604. The opening or inner surface 12 of the (assembled) annular clamp 116 comprises a generally cylindrical surface.

One or more receivers 19 may be embedded in the annular clamp 116 as illustrated in FIG. 3.

In an alternate embodiment, one or more receivers 19 may be mechanically secured, adhesively bonded, soldered, brazed, fused, or fastened to a notch or recess in the outer surface of annular clamp 116. For example, a pair of receivers 19 disposed radially opposite each other (e.g., approximately 180 degrees of separation) on or in the annular clamp 116. In this document, approximately means a tolerance of plus or minus ten percent of any value.

There are various possible examples for incorporating one or more receivers 19 into the annular clamp 116, which may be applied separately or cumulatively. Under a first example, there are redundant receivers 19 located approximately 180 degrees apart on the rotor 10 or shaft, which during rotation of the shaft with the clamp 116 provides mechanical balancing to align or neutralize the center of mass to shaft access.

In second example, a single receiver 19 is located on the rotor 10 or shaft and a balancing or counter-balance mass 51 (e.g., dielectric, polymeric, plastic, or composite with ceramic or glass filler) of approximately equal mass to the receiver is positioned approximately 180 degrees apart on the shaft, which during rotation of the shaft with the clamp 116 provides mechanical balancing to align or neutralize the center of mass to shaft access.

In a third example, a single receiver 19 is located on the rotor 10 or shaft and a balancing or counter-balancing strain sensor 101 of approximately equal mass to the receiver 19 is positioned approximately 180 degrees apart on the shaft, which during rotation of the rotor 10 or shaft with the clamp 116 provides mechanical balancing to align or neutralize the center of mass to shaft access.

In general, a strain sensor (e.g., 101) means any strain gauge, strain transducer, integrated circuit strain sensor, integrated circuit strain gauge, semiconductor (e.g., silicon) strain sensor, semiconductor strain gauge, piezoelectric sensor, piezoresistive sensor, micromechanical system (MEMS) sensor, a foil strain gauge, polycrystalline resistive sensor, capacitive strain sensor, or other transducer or sensor for estimating, measuring or sensing a magnitude of one or more strain vectors, or corresponding directions of the strain vector(s), or both, based on force(s) applied to the strain sensor, which is on or secured in, on or to an observed object to be measured. For example, foil strain gauge may comprise a metallic foil layer of conductive traces overlying one side of a dielectric substrate (e.g., flexible substrate), that supports elastic deformation of metallic foil layer; hence, a change in electrical property, such as resistance or capacitance. Further, in a foil strain gauge the opposite side of the dielectric substrate may adjoin a coupler to a rotor, shaft or other observed object, where the coupler may comprise an elastomeric layer (e.g., adhesively bondable elastomeric layer) or flexible adhesive layer. In some embodiments, certain strain sensors may comprise dual or triple strain gauges to measure orthogonal strain magnitudes (e.g., along Cartesian X and Y axes or along Cartesian X, Y and Z axes of a vehicle, implement, beam, shaft, rotor, or other observed object) that are approximately ninety degrees apart; other strain sensors may be configured to measure shear stress of a shaft exposed to torque; and still other strain sensors may be configured to measure shear stress in tension and compression of an observed object.

Figure 4:
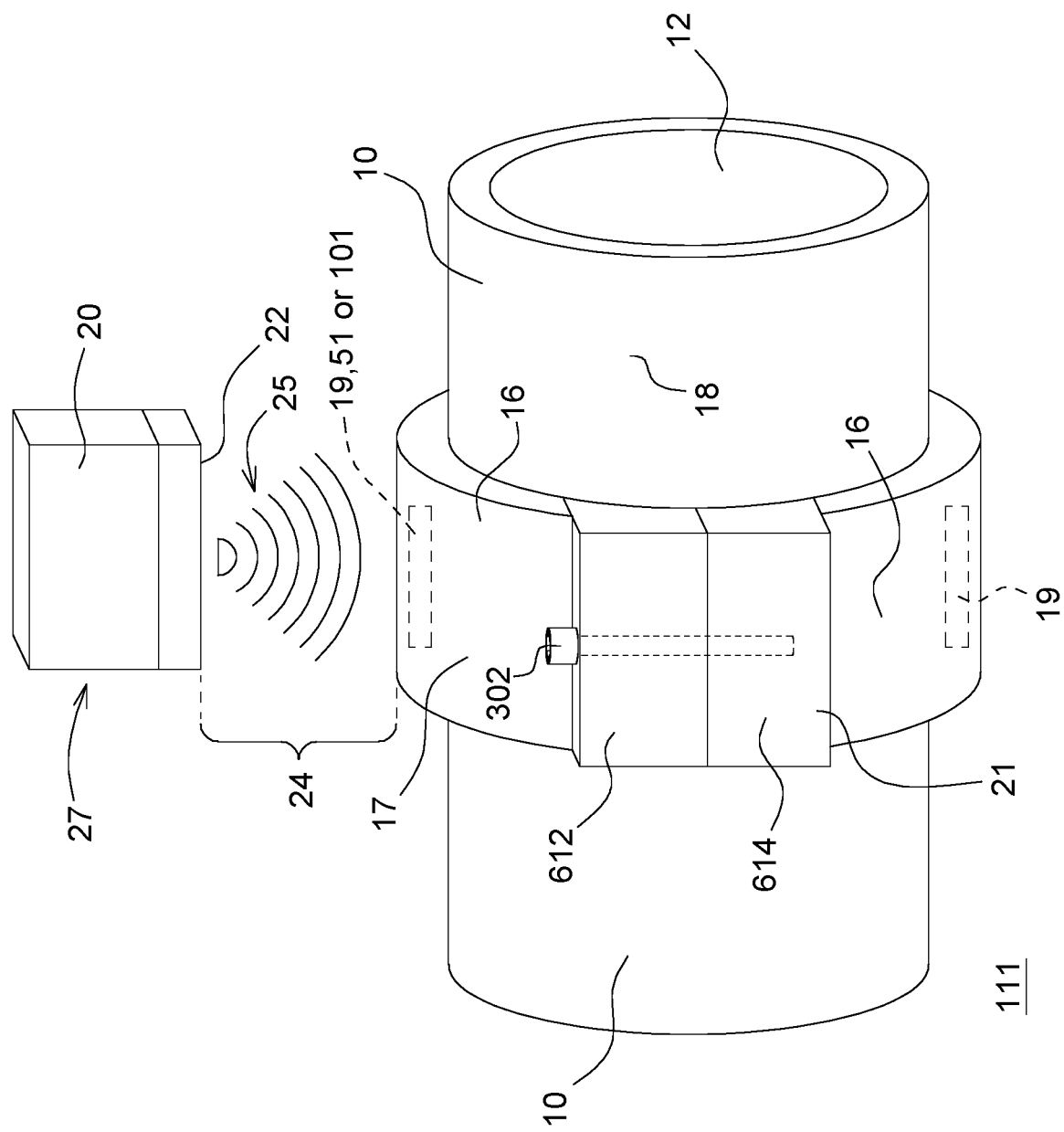
FIG. 4 is a perspective view of a second embodiment of an assembly for contactless transferring electrical energy to a rotor, such as a rotational shaft.

FIG. 4 is a perspective view of a second embodiment of an assembly 211 for contactless transferring electrical energy (e.g., possibly from approximately 10 milliwatts (mW) to approximately 500 milliwatts or more) to a rotor, such as a rotational shaft. The assembly 211 of FIG. 4 is similar to the assembly 111 of FIG. 1, except the assembly 211 replaces the annular clamp 116 with annular clamp 16, which has a boss or protrusion extending above an outer surface of the annular clamp 16. Like reference numbers in FIG. 1 through FIG. 6, or in any set of drawings indicates like features or elements.

Figure 5:
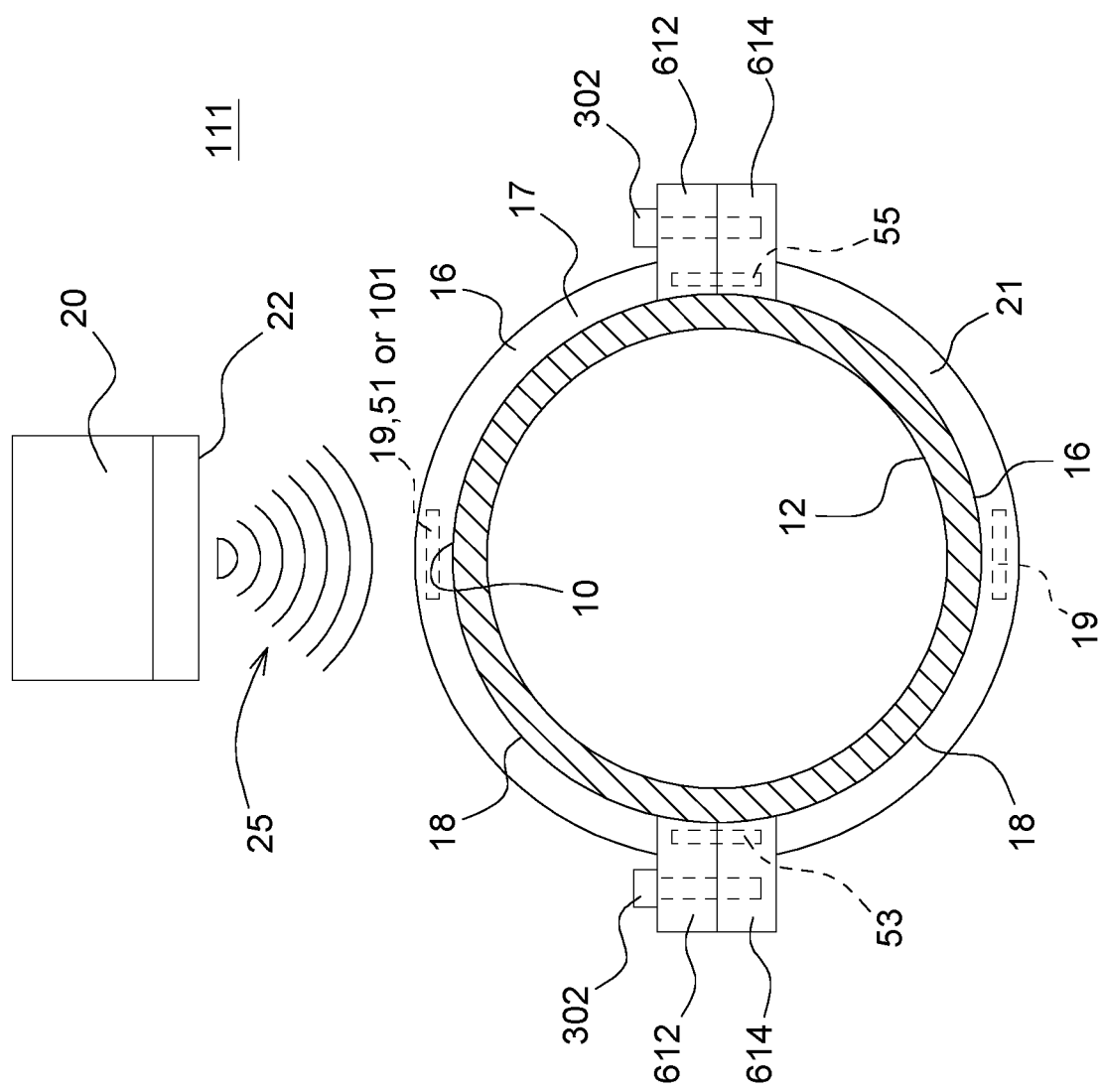
FIG. 5 is a cross-sectional view of the second embodiment of a rotor (e.g., rotational shaft) with an annular clamp and the transmitter in accordance with FIG. 4.
Figure 6:
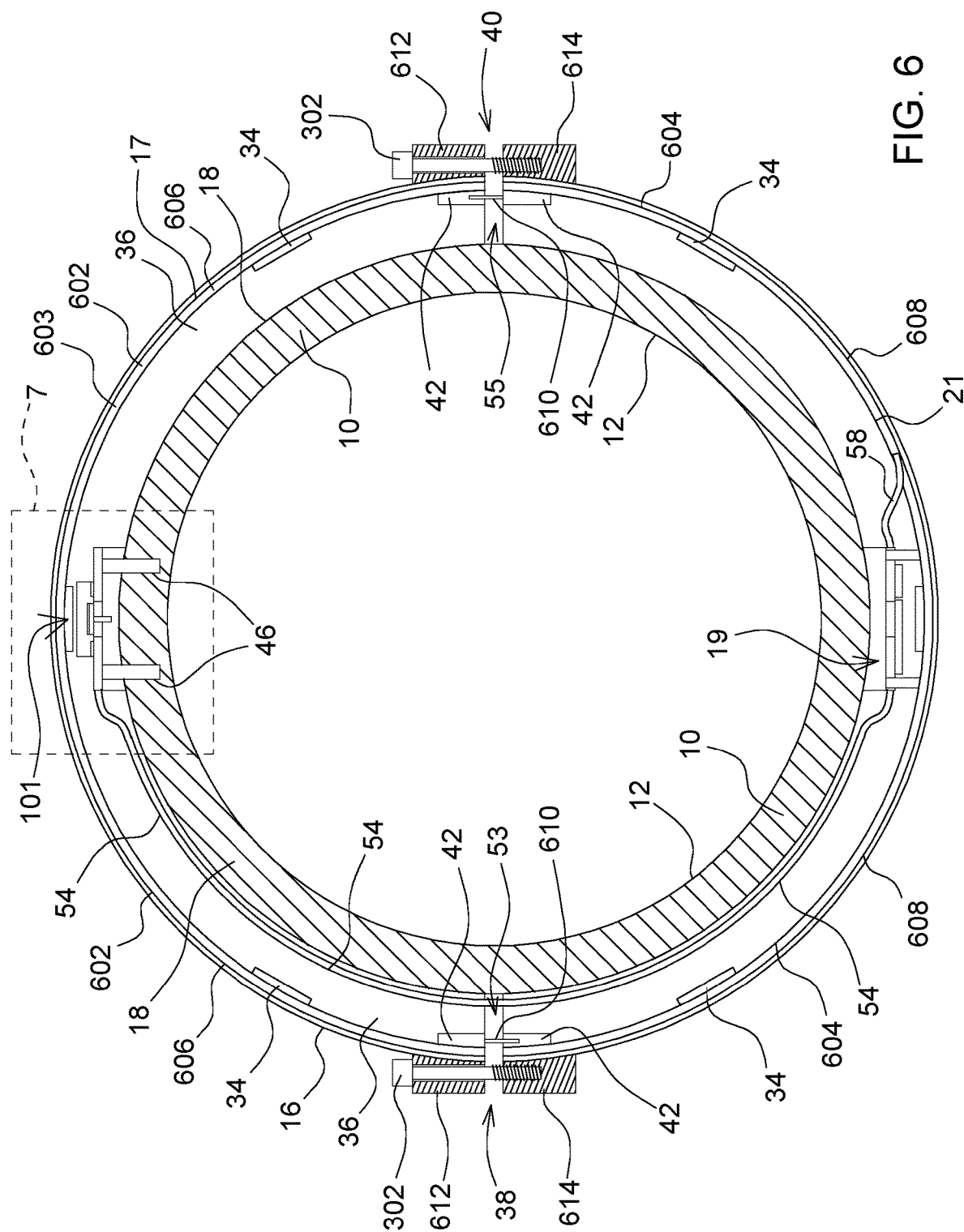
FIG. 6 is perspective of an annular clamp, consistent with FIG. 4.

Further, in FIG. 4 through FIG. 6, the first semi-elliptical portion 17 terminates in respective first protrusions 612 or first bosses; the second semi-elliptical portion 21 terminates in respective second protrusions or second bosses 614. Each first protrusion 612 and second protrusion 614 (e.g., or first and second bosses) form a mechanical connector (38, 40) and can be mated, joined or otherwise secured by fasteners 302, which in turn interconnects the first semi-elliptical portion 17 and the semi-elliptical portion 21 to form the annular clamp 16. The first protrusion 612 and the second protrusion 614 have bores that are aligned, where one of the bores is threaded to accept a corresponding fastener 302. Further, in certain configurations, if first protrusion 612 and second protrusion 614 (e.g., or first and second bosses) are mated, joined or otherwise secured by fasteners 302, then the antenna is simultaneously assembled via electrical connectors located radially inward from the first protrusion and the second protrusion. For example, the first semi-annular antenna portion 602 and the second semi-annular antenna portion 604 are connected by electrical connectors (53, 55).

FIG. 5 is a cross-sectional view of the second embodiment of a rotor 10 (e.g., rotational shaft) with an annular clamp 16 and the transmitter 20 in accordance with FIG. 4. FIG. 5 shows a better view of each fastener 302 engaging a corresponding first protrusion 612 and corresponding second protrusion 614 through bores. The fasteners 302 are shown in phantom as dashed lines. Similarly, the connectors (53, 55) are shown in phantom as dashed lines.

FIG. 6 is perspective view of an annular clamp 16, consistent with FIG. 4. FIG. 6 is similar to FIG. 5, except some features in FIG. 6 are illustrated in greater detail to FIG. 5. First, the strain sensor 101 is mounted opposite the receiver 19. Second, each electrical connector (53, 55) comprises one or more mating, engaging telescopic or interlocking conductors 610 that are retained by a dielectric connector body 42. Third, conductors, such as one or more wires 54, or multiconductor cables are shown illustrating the transmission line for providing electrical energy from the receiver 19 to the strain sensor 101. Alone or together with the wires 54, the outer housing (606, 608) can have a conductive portion that provides electrical energy the strain sensor 101 and that is appropriately grounded or at ground potential. Fifth, a side view of the antenna portions (602, 604) are shown, such as the first semi-annular antenna portion 602 and the second semi-annular antenna portion 604, where in certain embodiments the first semi-annular antenna portion 602 engages or interconnects with the second semi-annular antenna portion 604 at corresponding electrical connectors (53, 55). Where the electrical connectors (53, 55 of FIG. 6; 153, 155; 253, 255) may support, join or unite antenna portions (602, 604), of a respective receive antenna 603, that comprise one or more parallel conductors to form a set of metallic rings that are axially spaced apart (e.g., as a set of active and passive antenna members or radiators) or spirally wound, such as a wound coil or looped coil.

Figure 7:
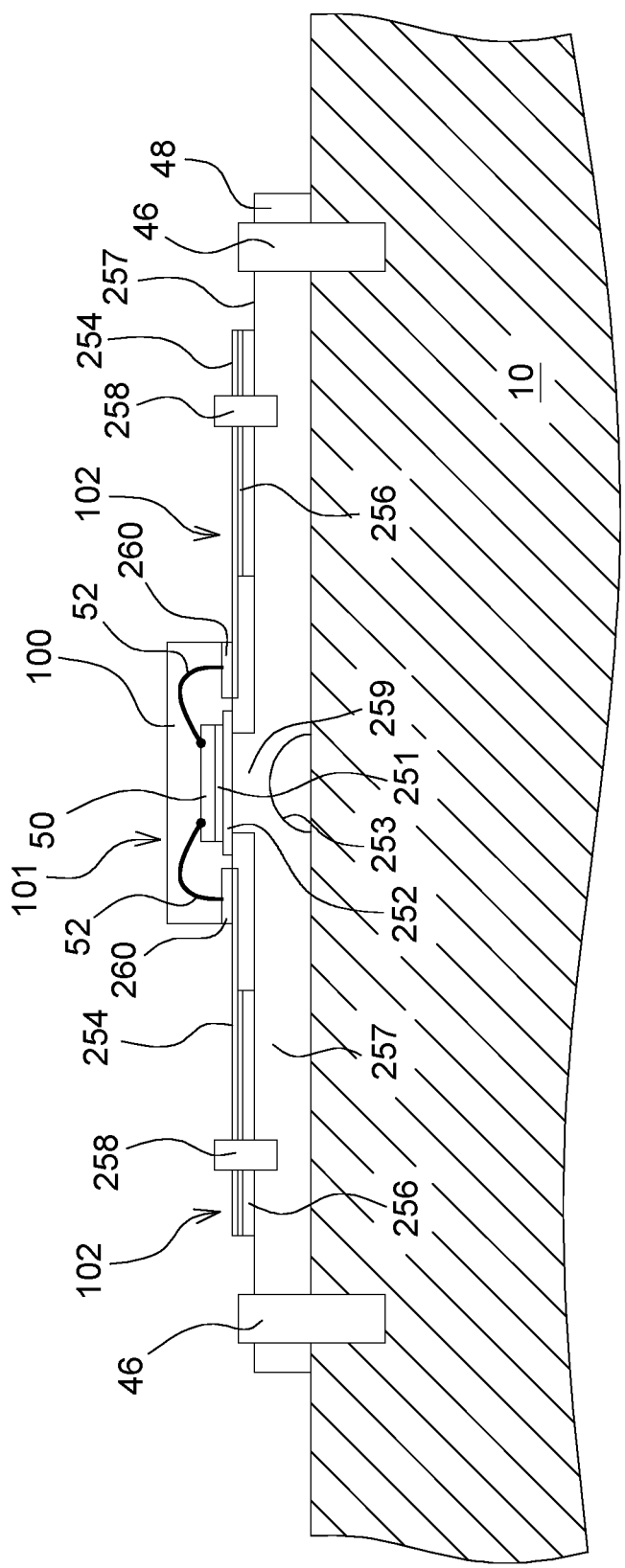
FIG. 7 is an enlarged view of rectangular region 7 in FIG. 6.

FIG. 7 is an enlarged view of rectangular region 7 in FIG. 6. FIG. 7 shows one embodiment of the strain sensor 101 in greater detail. FIG. 7 shows an enlarged version of the rectangular region 7 in FIG. 6, where the enlarged rectangular region 5 shows the strain sensor 101 in greater detail. FIG. 7 is a cross-section of a strain sensor 101 such as a piezoresistive sensor, strain gauge, strain sensing element, or the like that is disposed on the rotor 10 or shaft to measure any of the following sensor measurements: torque, torsional forces or torsional moments of the rotor 10 or shaft. The assembly (111, 211) for contactless transferring electrical energy to a rotor 10 can provide electrical energy to the strain sensor 101, alone or together with an amplifier, to support changes in measured resistance, voltage, current or other electrical parameters indicative of sensor measurements. During operation of the assembly (111, 211), the rotor 10 is generally rotated with respect to the stator 27 to generate or facilitate inductive transfer or wireless transfer of electrical energy from the transmitter 20 antenna of the transmitter 20 to the receiver 19 antennas portions of the receiver 19 of the rotor 10. Although wireless transfer of electric energy can occur when the rotor 10 is stationary, the receiver 19 is coupled to the receive antenna (603, 703, 803) and configured to facilitate the uniform transfer of electrical energy via the axial gap 24 between the transmitter and the receive antenna over a full angular range of rotation of the rotor, such that the radiation pattern of the receive antenna (603, 703, 803) can intercept and capture the signal that is distributed over the full angular range.

In one configuration, FIG. 7 comprises a rotor 10 or shaft in which a strain concentrator 257 is mechanically coupled or connected to the rotor 10 or the shaft. As illustrated in FIG. 7, the strain sensor 101 may be mounted to a shaft or rotor 10 via threaded bores (in the rotor 10) that accept fasteners 46. For example, the strain sensor 101 is mechanically coupled to the rotor 10 and is configured to receive electrical energy from the receiver 19 via wires (e.g., DC voltage carrying wires); wherein the rotor 10 is configured to measure torque or strain associated with the rotor 10. Further in certain configurations, the die 50 of the strain sensor 101 is mounted or adhesively bonded (e.g., via adhesive 251, such as epoxy) to the rotor 10 via a central pedestal portion 259 or elevated neck of a strain concentrator 257. Below the central pedestal portion 259 is a neck and an arched portion 253.

The shape, material (composition), and other parameters of strain concentrator 257 may be configured to present or introduce gain, dampening, or neutrality into the output signal path of the respective strain sensor 101 coupled to the strain concentrator 257. For example, the strain concentrator 257 may a first wide outer region and a second wide outer region that are interconnected by a central narrow neck region below the central pedestal portion 259, where the strain is concentrated (amplified) and where the strain sensor 101 can be mounted on the central narrow neck region or on a pedestal portion 259 extending above the central narrow neck region.

In accordance with mounting system 102, an optional stiffener 256 is positioned between a circuit board 254 (e.g., flexible circuit board or carrier) and a portion of the strain concentrator 257, such as portion that is located inward from the bores 48 and corresponding fasteners 46 that secure or attach the strain concentrator 257 to the respective rotor 10 or respective shaft. The fasteners 258 secure the circuit board 254 and stiffener 256 to the strain concentrator 257 via one or more bores therein.

The die 50 of the strain sensor 101 is mounted on a central portion or raised pedestal portion 259 of the strain concentrator 257. The circuit board 254 may have metallic pads or electrically conductive pads 260, where wire bonds 52 connect the electrically conductive pads 260 to a die 50 or semiconductor portion of the strain sensor 101. Further, the die 50 may be associated with a conductive ground plane or large (grounded) metallic pad 252 that is electrically connected and mechanically connected (e.g., soldered, brazed, attached by conductive adhesive) to the central portion or raised pedestal portion 259 of the strain concentrator 257. As illustrated in FIG. 7, the die 50, the conductive pads 260 and the wire-bonds 52 are encapsulated by a dielectric package 100.

Figure 8:
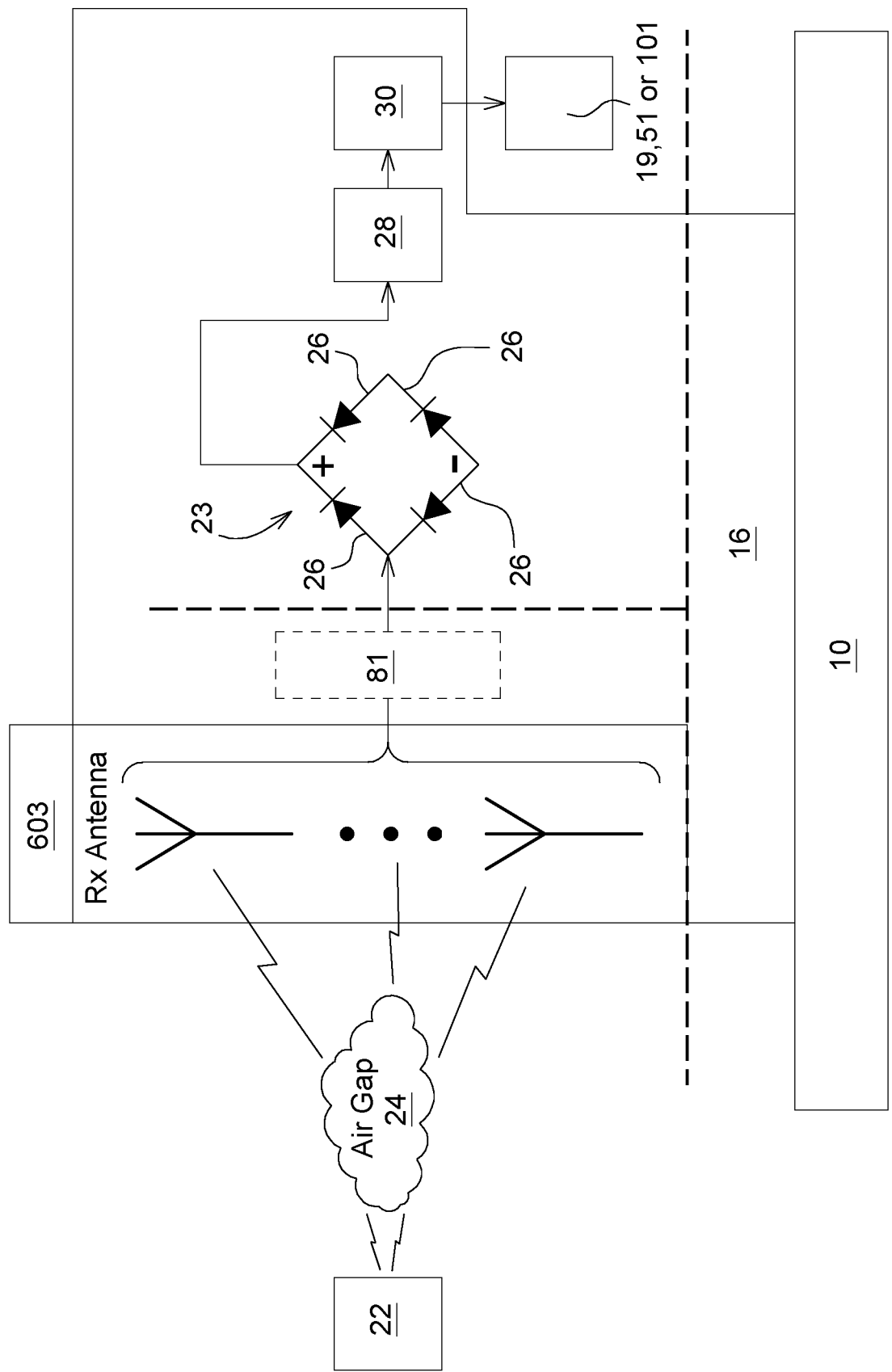
FIG. 8 is a block diagram or schematic of the assembly for contactless transferring electrical energy to a rotor.

FIG. 8 is a block diagram or schematic of the assembly for contactless transferring electrical energy to a rotor. As illustrated in FIG. 1, FIG. 2, FIG. 4 and FIG. 5, the transmitter 20 is on or co-located with the stator 27; the transmitter 20 is coupled to one or more transmit antennas 22 for transmitting an alternating current or electromagnetic frequency aligned or coordinated with a corresponding resonant frequency of any tuned circuit 81 of the receiver 19. For example, in one configuration the electromagnetic frequency, or transmit frequency range and receive frequency range is less approximately less than or equal to 100 Kilohertz (KHz) or below the Amplitude Modulation (AM) Broadcast band in the United States. The transmit antenna is stationary and supports a continuous power link with the receive antenna 603 of the annular clamp (16, 116). The transmitter 20 is configured to transmit an alternating current wireless signal or electromagnetic radiation. The transmit antenna 22 may use one or more ferrite members 34 to focus or shape the electromagnetic field in the gap 24 for enhanced inductive coupling or enhanced energy transfer between the receive antenna 603 and the transmit antenna 22. For instance, the ferrite members 34 may be ferrite blocks or ferrite beads, or other ferrite members that are radially distributed around an inner diameter of the conductors of the receive antenna 603 (e.g., to form a partial core). In certain embodiments, the receive antenna (603, 703, 803) comprises ferrite members (e.g., 34) arranged radially inward from the conductive traces or conductive loops of the receive antenna to concentrate the wireless signal; hence, energy transfer from the transmit antenna to the receive antenna, within the axial gap 24. Meanwhile optional ferrite members may form a core upon which the transmit antenna 22 is wound. The transmitter 20 and the transmit antenna 22 may be collectively referred to as stationary electronics, which can interface with a vehicle control system or communicate with electronic controllers or other network devices via a vehicle data bus, such as controller area network or Ethernet vehicle bus.

In one embodiment, the receive antenna 603 (e.g., generally circular, spiral or elliptical antenna) comprises a set one or more of electrical conductors embedded in, wrapped around, looped, wound around, or associated with the annular clamp (16, 116). The receive antenna 603 (e.g., generally circular, spiral or elliptical antenna, which can be wound, looped, or wrapped around or within the annular clamp) is configured to support a continuous link or continuous transfer (e.g., via inductive coupling) of power between the transmit antenna and the receiver antenna via the gap. For example, the receive antenna 603 comprises a first semi-annular antenna portion 602 and a second semi-annular antenna portion 604. In some embodiments, each of antenna portions (e.g., 602, 604) or the receive antenna (603, 703, 803) comprise a dielectric arched member with looped conductors or wire windings that feed one or more corresponding receivers 19. Further, in some embodiments, the receive antenna (603, 703, 803), the looped conductors or wire windings are circularly wound or spirally wound about engaged adjoining dielectric arched members or arched dielectric forms. The receive antenna 603 receives an alternating current signal or electromagnetic signal transmitted by the transmitter 20 and its transmit antenna. The receive antenna 603 is coupled to a tuned circuit 81 or a filter, such as a passband filter aligned with the transmit frequency range (e.g., frequency range within a half-power bandwidth) or transmit frequency (e.g., carrier frequency or central frequency) of the transmitter 20.

In FIG. 8, the receiver 19 comprises receive circuitry, such as a tuned circuit 81 and one or more rectifiers 23 or diodes 26, for receiving the alternating current signal and rectifying it to a target direct current voltage level. In one embodiment, the tuned circuit 81 is tuned or established to have a resonant frequency commensurate with or equal to a transmitting frequency or transmitting frequency range of a transmitter 20. For example, the tuned circuit 81 may be formed by a combination of a capacitor and an inductor (e.g., or receive antenna 603) that are placed in series or in parallel with respect to each other, where the values of the capacitor and inductor (e.g., or receive antenna 603) are selected to resonate at a resonant frequency commensurate with or equal to a transmitting frequency or transmitting frequency range of a transmitter 20. In some configurations, the inductor or receiver antenna may be associated with one or more ferrite members to adjust, increase or concentrate the inductance of the inductor (e.g., with respect to a baseline or reference air-core inductor configuration).

The alternating current output of the tuned circuit 81 is provided to rectifier 23 or diodes 26. As illustrated in FIG. 8, the rectifier 23 comprises a full-wave bridge rectifier 23 that comprises four diodes 26 that convert or rectify the alternating current signal to a direct current (DC) signal.

In one embodiment, the DC signal is provided to signal conditioner 28 or power conditioning circuit. For example, the signal conditioning 28 or power conditioning circuit may comprise any of the following: a low pass filter or an filtering capacitor to reduce alternating current noise in the signal, to smooth the DC signal fluctuation and to provide energy storage to support greater current draw of load devices that would otherwise be possible. The output of the signal conditioner 28 may be coupled to the input of voltage regulator.

The voltage regulator 30 may maintain a regulated output voltage within a certain voltage range. For example, the voltage regulator may comprise a linear and drop-out (LDO) regulator the provides a regulated output voltage, from an input voltage that may be higher than the target output voltage or target output voltage range of the LDO regulator. The output of the direct current (DC) may be at the output of the rectifier 23, the signal conditioner 28, or the voltage regulator 30, where the latter is preferred for a filtered, regulated or smoothed output DC voltage. The regulated output voltage may provide an output voltage, within a range of 1 VDC to 12 VDC, for example.

In certain configurations, the direct current (DC) signal may be used to provide electrical energy for a sensor or another electric device on the rotor 10 including one or more of the following: a strain sensor 101, and/or one or more receivers 19.

Each receiver 19 or strain sensor 101 can be embedded in a recess, pocket or hollow housing section 36 of the annular clamp 16. For example, the receiver 19 and strain sensor 101 are embedded in respective recess, pocket or hollow housing section 36 between or intermediately located between the mating or terminating ends of first semi-annular antenna portion 602 and a second semi-annular antenna portion 604. In particular, in some embodiments, the receiver 19 is embedded in the recess or hollow housing portion near or adjacent to an intermediate arched angular segment of the first semi-annular antenna portion (e.g., 602) and a second semi-annular antenna portion (e.g., 604). In certain embodiments, the receive antenna 603 terminates in a transmission line 58, such as conductor, wire or coaxial cable, connected to one or more receivers 19.

In an alternate embodiment, the receive antenna 603 has antenna portions that comprise a conductive foil layer patches or metallic patches, alone or together in electrical connection with one or more windings. In other embodiments, each of antenna portions comprise a dielectric arched member with wire windings that feed one or more corresponding receivers 19.

In another alternate embodiment, the wire windings of the receive antenna 603 are spirally, circularly, or otherwise wound about adjoining dielectric arched forms that define the annular clamp (16, 116).

Figure 9B:
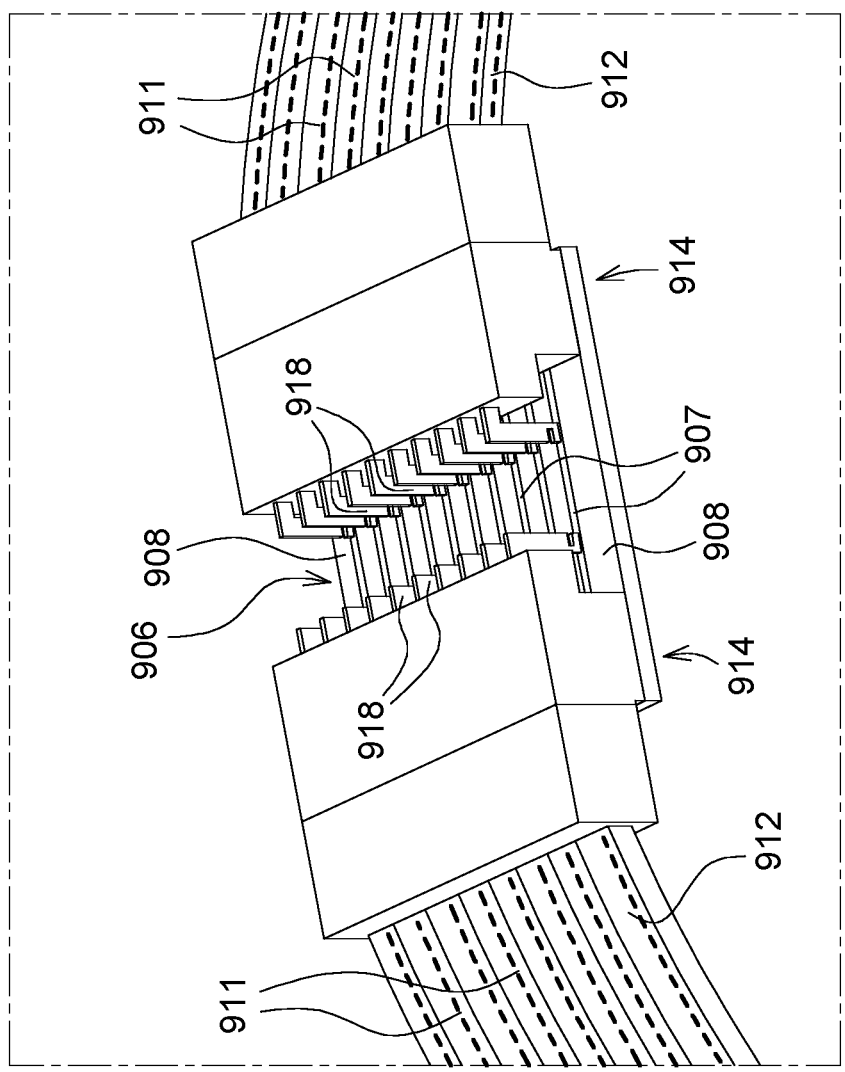
FIG. 9B is an enlarged view of rectangular region 9B in FIG. 9A.
Figure 9A:
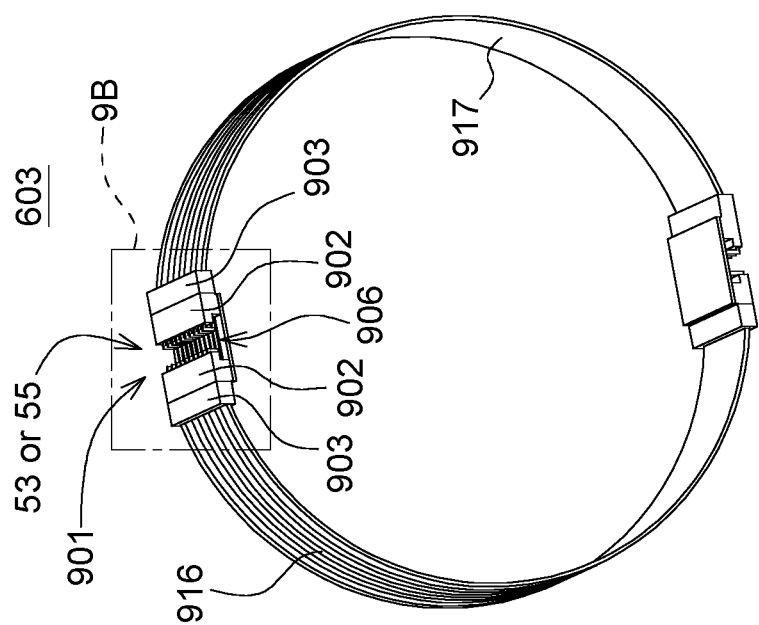
FIG. 9A is a perspective view of an embodiment of an antenna, which comprises a ribbon cable, in accordance with the assembly.

FIG. 9A is a perspective view of an embodiment of a receive antenna 603, which comprises a ribbon cable (916, 917), in accordance with the assembly. For example, the ribbon cable comprises a set of conductors 911 that are arched, semi-circular, ring segments, or rings that are axially spaced apart from each other and embedded within a flexible dielectric band 912. As shown in FIG. 9A, there are two separate ribbon cables (916, 017), where each end of a ribbon cable terminates in a respective cable connector portion 903. Although certain configurations of connector portions (902, 903) may be directly connected, as illustrated in FIG. 9A the connector portions (902, 903) are coupled via an intermediate circuit board 906; the circuit board 906 comprises a dielectric substrate 908 and conductive circuit traces 907 (e.g., metallic circuit traces), where the conductive traces 907 overlie on at least one side of a dielectric substrate 908 (or both sides in certain configurations). Each connector portion (902, 903) may comprise contact pins or contact terminals 918 that engage the conductive circuit traces 907 in mechanical and electrical contact. For example, the contact pins or contact terminals 918 may be engaged, rested, soldered, brazed, fused, crimped, compressed, or bonded (e.g., via conductive adhesive) to the corresponding conductive traces 907 or pads associated with the conductive traces 907 on the intermediate circuit board 906.

In FIG. 9A, each connector portion may have a ribbon cable connector portion (903) and a board connector portion (902), where the ribbon cable connector portion (903) terminates the ribbon cable (916, 917) and is mechanically and electrically connected to the set of conductors in the ribbon cable. Meanwhile, the board connector portion 902 is mechanically electrically connected to the conductive traces 907 or corresponding pads of the circuit board 906. At least one side of the ribbon cable connector portion 903 and a corresponding side of the board connector portion 903 comprise a optional snap-fit connector 914. Each optional snap-fit connector 914 comprises an elastically deformable arm that terminates in or features a snap-fit protrusion on one connector portion (902, 903), where the snap-fit protrusion removably engages a corresponding snap-fit recess on the opposite or mating connector portion of the connector. The optional snap-fit connector 914 can removably join the ribbon connector portion 903 and its corresponding board connector portion 902 to form reliable, mechanical and electrical connections between the conductors of the receive antenna 603 and the corresponding conductive traces 907 on the circuit board 906. For example, optional snap-fit connector 914 can be removed by pressing the deformable arm inward, where the snap-fit connector 914 may be accessible by removing an outer housing or portion of the outer housing (e.g., removable plug). The ribbon cable connector portion 903 comprises an outer dielectric body, with a first optional snap-fit connector portion, which houses an inner set of pins or first contacts. The board connector portion 902 comprises an outer dielectric body, with a second optional snap-fit connector portion, that houses an inner set of pins or second contacts, where the first optional snap-fit connector can engage the second optional snap-fit connector portion when the optional snap-fit connector 914 is in a connected state, and wherein the first contacts engage the second contacts to form a continuous connection of the conductors in opposing or united ribbon cables (916, 917).

FIG. 9B is an enlarged view of rectangular region 9B in FIG. 9A.

FIG. 10A is a perspective view of another embodiment of an antenna 803, which comprises a flexible circuit board (816, 817), in accordance with the assembly (111, 211). Receive antenna 803 can generally replace receive antenna 603 in any drawings or embodiments set forth in this disclosure. FIG. 10A is similar to the configuration of FIG. 9A and FIG. 10B. Notably, in FIG. 10A and FIG. 10B the ribbon cable (916, 917) is replaced with a flexible circuit board (816, 817), where the flexible circuit (816, 817) board may comprise a polyimide or polyimide-based substrate 812 with metallic traces 811 bonded, deposited (e.g., vapor deposition), or otherwise formed on or within the substrate 812. For example, in one configuration the flexible circuit board (816, 817) comprises a set of conductors or conductive traces 811 that are arched, semi-circular, ring segments, or rings that are axially spaced apart from each other and embedded within a flexible substrate 812 or flexible dielectric band.

As shown in FIG. 10A, there are two separate flexible circuit boards (816, 817), where a first end of the flexible circuit board terminates in a female connector portion 825 and a second end of the flexible circuit board terminates in a male connector portion 824. For example, the female connector portion 825 and the male connector portion 824 may define or form a card-edge connector or a connector that resembles a card-edge connection. In particular, the male portion 824 may have a circuit board that comprises a rigid substrate with conductive or metallic traces on one or both sides of the substrate. The conductive or metallic traces 811 are electrically and mechanically connected (e.g., via bonding, solder or conductive adhesives) to corresponding conductors of a flexible circuit board, 816, 817, (e.g., first flexible circuit board) that the male portion 824 terminates. Meanwhile, the female portion 825 may receive the male portion 824 in a slot or recess, in which elastically deformable conductors, terminals or spring-loaded terminals can be aligned with the conductive or metallic traces 811 on one or both sides of the substrate 812 to form a reliable electrical and mechanical connection to the male connector 824 of the first flexible circuit board 817. Further, the conductors or terminals of female portion 825 are electrically and mechanically connected to another flexible circuit board (e.g., second flexible circuit board 816). For example, the conductors or terminals of the male portion 824 and/or the female portion 825 may be soldered, brazed, fused, crimped, compressed, or bonded (e.g., via conductive adhesive) to the corresponding conductive traces 811 or pads associated with the conductive traces on respective flexible circuit board.

In FIG. 10A, each connector may have a first connector portion (e.g., male connector portion 824) and a second connector portion (e.g., female connector portion 825), where each connector portion terminates a corresponding flexible circuit board, 816, 817, (or flexible cable based on a flexible circuit board) and is mechanically and electrically connected to the set of conductors in the flexible circuit board.

At least one side of the first connector portion and a corresponding side of the second connector portion comprise a optional snap-fit connector 814. Each optional snap-fit connector 814 comprises an elastically deformable arm that terminates in or features a snap-fit protrusion on one connector portion, where the snap-fit protrusion removably engages a corresponding snap-fit recess on the opposite or mating connector portion of the connector 814. The optional snap-fit connector 814 can removably join the first connector portion and its corresponding second connector portion to form reliable, mechanical and electrical connections between the conductors of the receive antenna 803, which are defined by corresponding conductive traces 811 on the flexible circuit board (916, 917). For example, optional snap-fit connector 814 can be removed by pressing the deformable arm inward, where the snap-fit connector 814 may be accessible by removing an outer housing or portion of the outer housing (e.g., removable plug). The first connector portion comprises an outer dielectric body, with a first optional snap-fit connector portion, which houses an inner set of pins or first contacts. The second connector portion comprises an outer dielectric body, with a second optional snap-fit connector portion, that houses an inner set of pins or second contacts, where the first optional snap-fit connector portion can removably engage the second optional snap-fit connector portion when the optional snap-fit connector 814 is in a connected state, and wherein the first contacts engage the second contacts to form a continuous connection of the conductors in opposing or united flexible circuit board cables.

FIG. 10B is an enlarged view of rectangular region 10B in FIG. 10A.

FIG. 11A is a perspective view of yet another embodiment of an antenna 703, which comprises another flexible circuit board, in accordance with the assembly. Receive antenna 703 can generally replace receive antenna 603 in any drawings or embodiments set forth in this disclosure. The embodiment of FIG. 11A and FIG. 11B incorporates a flexible circuit board, an intermediate circuit board, a first connector portion and a second connector portion.

FIG. 11A is a perspective view of another embodiment of a receive antenna 703, which comprises a flexible circuit board (716, 717), in accordance with the assembly. FIG. 11A has certain similarities to the configuration of FIG. 9A and FIG. 9B. Notably, in FIG. 11A and FIG. 11B the ribbon cable of FIG. 9A and FIG. 9B is replaced with a flexible circuit board (716, 717) or a cable based on flexible circuit board, where the flexible circuit board may comprise a polyimide or polyimide-based substrate 712 with metallic traces 711 bonded, deposited (e.g., vapor deposition), or otherwise formed on or within the dielectric substrate 712. For example, in one configuration the flexible circuit board (716, 717) comprises a set of conductors or conductive traces 711 that are arched, semi-circular, ring segments, or rings that are axially spaced apart from each other (or spirally wound) and embedded within a flexible substrate 712 or flexible dielectric band. The cable based on flexible circuit board (716, 717) may be embedded or housed within (e.g., a recess or hollow portion of) the annular clamp (16, 116). Further the flexible circuit board (716, 717) with a recess or hollow portion of the annular clamp (16, 116) may be filled with a dielectric adhesive, sealer, or potting compound (e.g., silicone, latex, polymeric or plastic materials).

As shown in FIG. 11A, there are two separate cables based on respective flexible circuit boards (716, 717), where each end of the cable is terminates in a connector portion (253, 255). Although certain configurations of connector portions (253, 255) may be directly connected, as illustrated in FIG. 11A the connector portions (253, 255) are coupled via an intermediate circuit board 719 (e.g., flexible or rigid circuit board, such as fiberglass, ceramic or polymer circuit board) or similar connector platform; the intermediate circuit board 719 comprises a substrate and conductive circuit traces (e.g., metallic circuit traces), where the conductive traces overlie on at least one side (or optionally both sides) of a dielectric substrate. Each connector portion (253, 255) may comprise contact pins or contact terminals (713, 714) that engage or contact the conductive circuit traces 711 in mechanical and electrical contact. For example, the contact pins or contact terminals (713, 714) may be rested, soldered, brazed, fused, crimped, compressed, or bonded (e.g., via conductive adhesive) to the corresponding conductive traces or pads associated with the conductive traces 711 on the intermediate circuit board.

In FIG. 11A, each connector (253, 255) may have a first connector portion 253 (e.g., a first interlocking connector portion) and a second connector portion 255 (e.g., second interlocking connector portion), where each connector portion (253, 255) terminates a corresponding flexible circuit board, 716, 717 (or flexible cable based on a flexible circuit board) and is mechanically and electrically connected to the set of conductors or metallic traces 711 in the flexible circuit board (716, 717) via spring-loaded terminals, compression-loaded pins, or retained conductors, such as contact terminals (713, 714).

At least one side of the first connector portion 253 and a corresponding side of the second connector portion comprise a optional snap-fit connector 715. Each optional snap-fit connector 715 comprises an elastically deformable arm that terminates in or features a snap-fit protrusion on one connector portion, where the snap-fit protrusion removably engages a corresponding snap-fit recess on the opposite or mating connector portion of the connector 715. The optional snap-fit connector 715 can join securely and removably the first connector portion 253 and its corresponding second connector portion 255 to form reliable, mechanical and electrical connections between the conductors of the receive antenna 703, which are defined by corresponding conductive traces 711 on the flexible circuit board (716, 717). For example, optional snap-fit connector 715 can be removed by pressing the deformable arm inward, where the snap-fit connector 715 may be accessible by removing an outer housing or portion of the outer housing (e.g., removable plug). The first connector portion 253 comprises a first dielectric body, with a first optional snap-fit connector portion, which houses an inner set of pins or first contact terminals 714. The second connector portion 255 comprises a second dielectric body, with a second optional snap-fit connector portion, that houses an inner set of pins or second contact terminals 713, where the first optional snap-fit connector portion can engage the second optional snap-fit connector portion when the optional snap-fit connector 715 is in a connected state, and wherein the first contacts engage the second contacts to form a continuous connection of the conductors in opposing or united flexible circuit board cables. When mated or interlocked and retained via the optional snap-fit connector 715, the first connector portion 253 and the second connector portion 255 may overlie an intermediate circuit board with bridging conductive traces 711 or metallic traces that facilitate an electrical connection between the first connector portion 253 and the second connector portion 255; hence, an electrical and mechanical connection between different cable segments of the flexible circuit board of the receive antenna 703.

FIG. 11B is an enlarged view of rectangular region 11B in FIG. 11A.

Advantageously, installation of the annular clamp (16, 116), which can comprise a strain sensor 101 and receiver 19 for contactless transfer of alternating current electrical energy (or electromagnetic energy) from a transmitter 20 of a stator, does not require one to have access to the end(s) of a rotor 10 (e.g., shaft) for installation. Rather, the annular clamp (16, 116) can be conveniently installed on a middle of the rotor 10 (e.g., shaft). In mechanical or electromechanical equipment or systems, a shaft or rotor can accessible only within housings or sometimes can be buried deep within adjacent mechanical or electro-mechanical systems such that installation is facilitated by only requiring access to the middle of the shaft or rotor, instead of the ends of the shaft or rotor.

The assembly for contactless transfer of electrical energy to a rotor can provide continuous power over the entire angular rotation range (e.g., 360 degrees) of the shaft or rotor, has a greater tolerance for variation in mechanical alignment that supports reliable manufacturing, and can be scaled to fit a wide variety of rotor and shaft sizes. First, in conjunction with the assembly, the energy or power transfer to the rotor is reliable because the electrical energy is continuous (e.g., as opposed to intermittent) and is not affected materially by rotation angle, shaft position, or rotation speed. The assembly is well-suited to provide a continuous coupling of energy that is independent of shaft position or speed.

Second, the assembly for contactless transfer of electrical energy to a rotor is resistant or tolerant to some manufacturing variation, such as increased gap distance or separation between the transmit antenna and the receive antenna, subject to respective engineering limitations associated with requisite transfer of electrical energy or requisite power.

Third, the assembly for contactless transfer of electrical energy can be adjusted, scaled or configured to be compatible with machinery of different rotor sizes and shaft sizes. The power and electrical energy coupling can be tailored and scaled to meet the mechanical interface needs of a wide variety of shaft sizes and form factors.

Although certain embodiments of receivers, systems, methods, processes and examples have been described in this disclosure, the scope of the coverage of this disclosure may extend to variants of the receiver, systems, methods, processes and examples and systems and concepts disclosed herein. For example, in any patent that may be granted on this disclosure, one or more claims can cover equivalents and variants to the full extent permitted under applicable law, among other things.

What is claimed is:

1. An assembly for transferring electrical energy, the assembly comprising:
   a stator;
   a rotor separated from the stator for relative rotation with respect to the stator;
   an air gap between the rotor and the stator;
   a transmitter associated with or on the stator, the transmitter configured to transmit an alternating current wireless signal;
   an annular clamp comprising a first semi-elliptical portion and a second semi-elliptical portion that define an opening for receipt of the rotor, the annular clamp having fasteners to secure the first semi-elliptical portion to the second semi-elliptical portion about the rotor;
   a receive antenna configured to receive the wireless signal, the receive antenna comprising one or more conductive traces on a flexible dielectric substrate; and
   a receiver associated with the annular clamp, the receiver being coupled to the receive antenna and configured to facilitate the uniform transfer of electrical energy via the air gap between the transmitter and the receive antenna over a full angular range of rotation of the rotor;
   wherein the receive antenna comprises a first semi-annular antenna portion and a second semi-annular antenna portion embedded in the annular clamp, wherein the first semi-annular antenna portion and the second semi-annular antenna portion are united to form one or more looped conductors of the receive antenna.

2. The assembly according to claim 1 wherein the rotor further comprises a shaft; an inner diameter of the annular clamp being generally cylindrical and wherein the inner diameter is arranged to receive the shaft to retain the annular clamp.

3. The assembly according to claim 2 wherein the clamp is retained by a press-fit or compressive force against the shaft.

4. The assembly according to claim 1 wherein a load-balancing mass is disposed radially opposite of the receiver in or on the annular clamp.

5. The assembly according to claim 1 wherein the first semi-elliptical portion has a first pair of openings and wherein the second semi-elliptical portion has a second set of threaded openings for receiving the fasteners to unite the first semi-elliptical portion and the second semi-elliptical portion about the rotor.

6. The assembly according to claim 1 wherein the receiver comprises a tuned circuit and a rectifier, the rectifier comprising diodes for receiving the alternating current signal and rectifying it to a direct current voltage.

7. The assembly according to claim 1 wherein the receiver further comprises:
   a signal conditioner coupled to the rectifier to filter the direct current signal; and
   a voltage regulator coupled to the output of a signal conditioner to provide a regulated direct current output at a target output voltage range.

8. The assembly according to claim 1 wherein the transmitter is on the stator, the transmitter configured to transmit an alternating current wireless signal.

9. The assembly according to claim 1 wherein the opening of the annular clamp comprises a generally cylindrical surface.

10. The assembly according to claim 9 wherein the receiver is embedded in the recess or hollow housing portion near or adjacent to an intermediate arched angular segment of the first semi-annular antenna portion and a second semi-annular antenna portion.

11. The assembly according to claim 1 wherein the receiver is embedded in a recess of the annular clamp.

12. The assembly according to claim 11 wherein the receive antenna comprise ferrite member arrange radially inward from the conductive traces of the receiver antenna to concentrate the wireless signal within the axial air gap.

13. The assembly according to claim 11 wherein each of antenna portions comprise a dielectric arched member with looped conductors or wire windings that feed one or more corresponding receivers.

14. The assembly according to claim 13 wherein the looped conductors or wire windings are circularly wound about engaged adjoining dielectric arched members.

15. The assembly according to claim 1 wherein the rotor is rotated with respect to the stator to generate the inductive transfer or wireless transfer of electrical energy from the transmit antenna of the transmitter to the receiver antennas portions of the receiver of the rotor.

16. The assembly according to claim 1 wherein a strain sensor is mechanically coupled to the rotor and is configured to receive electrical energy from the receiver; wherein the rotor is configured to measure torque or strain associated with the rotor.

17. The assembly according to claim 1 wherein a strain sensor is mounted to the rotor via a central pedestal portion or elevated neck of a strain concentrator.

* * * * *